May 19, 1936.  D. J. CAMPBELL  2,041,113
INTERNAL COMBUSTION ENGINE PISTON
Filed May 23, 1935
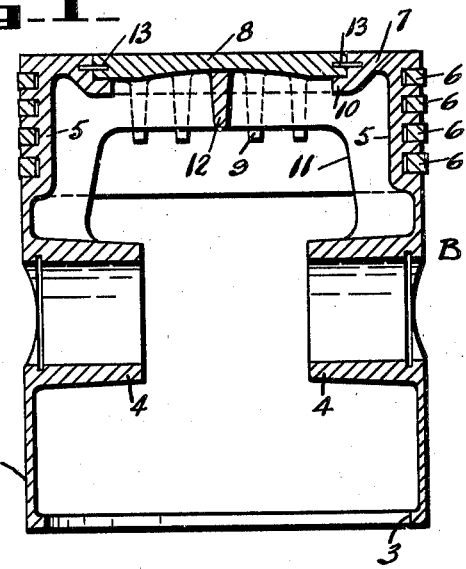
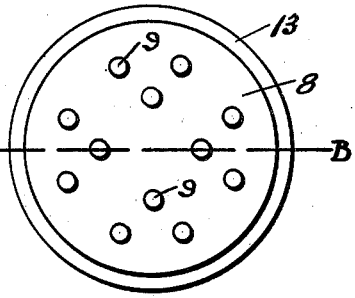
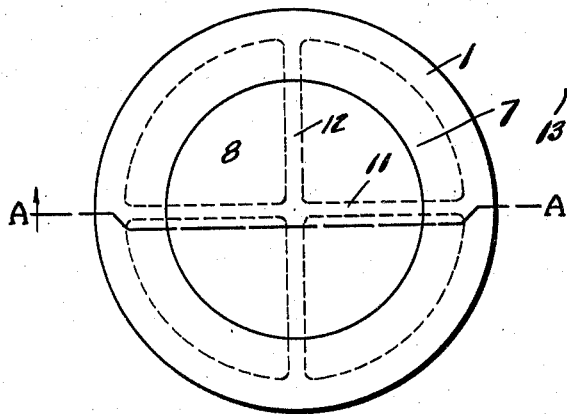
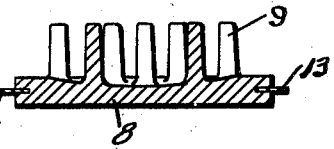
INVENTOR
DONALD J. CAMPBELL
BY
Charles W. Dake
ATTORNEY Patented May 19, 1936

2,041,113

UNITED STATES PATENT OFFICE 2,041,113

INTERNAL COMBUSTION ENGINE PISTON

Donald J. Campbell, Spring Lake, Mich., assignor to Campbell, Wyant and Cannon Foundry Company, Muskegon Heights, Mich., a corporation of Michigan Application May 23, 1935, Serial No. 23,109

4 Claims. (Cl. 309—14)

This invention relates to pistons and particularly to single acting pistons for internal combustion engines. The objects of invention are, to produce a piston that will increase the efficiency of the engine, to reduce detonation within the engine and to produce such a piston cheaply. An understanding of the invention, whereby the attainments of the objects stated are secured as well as others not enumerated, may be had from the following description taken in connection with the accompanying drawing, in which:

Fig. 1 is a sectional view taken on line A—A of Figure 2.

Fig. 2 is a plan view of the piston's closed end.

Fig. 3 is a plan view of the copper heat conduction insert, and

Fig. 4 is a sectional view of the copper heat conduction insert taken on line B—B of Figure 3.

In the drawing, like reference characters refer to like parts throughout the several views thereof, and referring thereto:

The piston body 1 has the usual skirt portion 2 provided with the centering ring 3 and wrist pin bosses 4 above which is a thickening portion 5 wherein is machined packing ring grooves for carrying the usually employed packing rings 6. At the upper end of the piston which is farthest from the centering ring 3 is an inwardly projecting annular flange 7 embracing a heat conduction member 8 having a plain upper surface flush with the plain or upper surface of the flange 7. This heat conduction member is made from copper or other metal having a higher heat conduction factor than cast iron from which the piston body is usually made as well as aluminum and is at its under side slightly concave and provided with a plurality of pin-like, heat dissipating projections 9. Closely fitting the edge of the lower side of the insert 8 is a shoulder 10 integral with the annular flange 7 and closely fitting the concave side of the insert are supporting ribs 11 and 12 whereby the insert, which is of a ductile metal such as copper, is prevented from being bent downward by the force of compression and pressure generated by combustion in the engine's cylinder. At the joinder between the periphery of the insert 8 and the flange 7, respectively, and embedded in each "the flange 7 and insert 8" is a steel or other suitable metal annular sealing ring 13 which retains the insert in place in the flange 7 and seals the joint against leakage of pressure between the flange 7 and the insert 8.

In the production of the present invention, a mold is made from a pattern of the insert 8. The annular ring 13 having been made from steel or other suitable sheet or other metal, it is placed in the mold and the insert cast onto it which becomes joined to the insert as by fusion. After the insert is cast and having the annular ring embedded in its periphery, a mold is made from a pattern of the piston body, including the core for forming the interior of the piston, which core is formed embracing the heat dissipation projection pins 9. The core is placed in the mold, in required position and held in such position by the usual core prints. The mold is then closed and the molten metal, such as iron and its alloys, is poured into the mold through a runner and gate as is usually provided for conducting molten metal to a mold. In preparing the ring 13, it is usually stamped from sheet metal, cleaned, and in some cases coated with a suitable flux or coated with another metal as tin or solder and then placed in the insert mold and the insert cast onto the ring. After the insert is cast with the ring embedded in it, the whole insert is cleaned and again the ring is coated as before and the core made to embrace its concave side and its pin-like projections. The core with the insert is then placed in the mold and the casting made, after which the casting and upper side of the insert are machined to the piston's required dimensions for placement in the engine.

It should be understood that while in detail, one method of producing a piston having the heat conduction insert is described herein, other methods of preparing a mold and casting such a piston may be employed without departing from the invention, and what is claimed is:

1. A single acting piston for internal combustion engines, comprising among other elements, a skirt portion, a packing ring portion and a head portion, the said head portion consisting of an inwardly extending annular flange having a shoulder and insert member of greater heat conductivity than the packing ring carrying portion or skirt supported by the inwardly extending flange of the head portion and means consisting of a metal washer embedded in the metal of the inwardly extending flange and the insert for sealing the joint between the said insert and flange against leakage of pressure within the cylinder of the engine therefrom.

2. In a single acting piston comprising a skirt portion, a packing ring carrying portion and a head portion, the said head portion consisting of an annular flange extending inwardly from the packing ring carrying portion, and having a shoulder, an insert having a higher conduction factor than the conductivity factor of the annular flange engaging the said shoulder and supported by the annular flange and means embedded in the metal of the annular flange and the metal of the insert for supporting the insert and preventing leakage of pressure within the cylinder from leaking through the joint between the annular flange and insert.

3. In a single acting piston comprising a skirt portion, a packing ring carrying portion and a head portion, the said head portion consisting of an annular flange extending inwardly from the packing ring carrying portion, an insert having a higher conduction factor than the conductivity factor of the annular flange, and means embedded in the metal of the annular flange and the metal of the insert for supporting the insert and preventing leakage of pressure within the cylinder from leaking through the joint between the annular flange and insert.

4. A single acting piston for internal combustion engines comprising among other elements, a skirt portion, a packing ring supporting portion and a head portion, the said head portion consisting of an inwardly extending flange and an insert member of greater heat conductivity than the flange secured to the flange by a circular member associated with the insert and embedded in the metal of the flange.

DONALD J. CAMPBELL.